United States Patent [19]

Myers

[11] 4,214,266

[45] Jul. 22, 1980

[54] REAR VIEWING SYSTEM FOR VEHICLES

[76] Inventor: Charles H. Myers, 2848 Scottsdale Dr., San Jose, Calif. 95122

[21] Appl. No.: 916,519

[22] Filed: Jun. 19, 1978

[51] Int. Cl.² .............................................. H04N 7/18

[52] U.S. Cl. ..................................... 358/108; 358/93; 358/103; 358/107

[58] Field of Search .................. 358/93, 103, 107, 108

[56] References Cited

U.S. PATENT DOCUMENTS

| | | | |
|---|---|---|---|
| 2,168,566 | 8/1939 | Goldsmith | 358/93 |
| 3,402,298 | 9/1968 | Janeway | 358/107 |
| 3,721,499 | 3/1973 | Narbaits-Jaureguy | 358/103 |
| 3,882,268 | 5/1975 | Ogawa | 358/108 |
| 3,909,519 | 9/1975 | Page | 358/107 |

FOREIGN PATENT DOCUMENTS

| | | | |
|---|---|---|---|
| 1343660 | 10/1963 | France | 358/108 |
| 1377315 | 9/1964 | France | 358/108 |
| 934037 | 8/1963 | United Kingdom | 358/108 |

*Primary Examiner*—Howard W. Britton
*Attorney, Agent, or Firm*—David A. Boone

[57] ABSTRACT

A visual aid system for assisting an operator while he maneuvers a vehicle comprises a closed circuit video system having distance measuring apparatus. The system enables the operator to see behind the vehicle and, through the use of the distance indicating apparatus, the operator can tell how far the rear of the vehicle is from objects seen via the video system.

9 Claims, 10 Drawing Figures

REAR VIEWING SYSTEM FOR VEHICLES

BACKGROUND AND SUMMARY OF THE INVENTION

The present invention relates to an improved visual aid system for assisting an operator while he is backing a truck, recreational vehicle, or other transporter into a given parking site and has particular applicability to transporters in which the rear of the transporter is blocked from the view of the operator while he is seated in the cab or other operator's station. More specifically, the invention involves the use of a closed circuit video system together with distance indicating means which visually shows to the operator the decreasing distance from the transporter to the rear end of the parking site as the transporter is being backed.

The operator of a truck or truck and trailer unit often experiences considerable difficulty in maneuvering the vehicle in reverse because he commonly cannot see directly to the rear thereof. Hence, the operator can be blind to objects on the road or to overhead obstructions and often experiences difficulty, without the aid of an assistant acting on foot as a spotter, to not only safely back the transporter, but to accurately maneuver it so that the rear of the transporter is squarely up to a loading dock. If a spotter is not available, the operator must either take his chances or get in and out of the vehicle several times to check his backing progress.

Safety and economic considerations have long dictated an alternative superior to the foregoing operator options, which would effectively take the blinders off the operator while backing and could be of rear view assistance to him while driving along a highway.

In the past some consideration has been given to the use of closed circuit television in vehicles. For example, British Pat. No. 934,037 discloses an articulated truck and trailer unit in which a television camera is arranged to view through a rear window in the trailer and a television monitor is mounted with its viewing screen in the dashboard of the truck. French Pat. Nos. 1,343,660 and 1,396,129 also disclose rear view television use on vehicles. British Pat. No. 1,155,807 discloses a rear observation closed circuit television system for automobiles in which there is a deflecting circuit switching arrangement adapted to switch the horizontal deflecting circuit of the television camera to reverse polarity so that when the camera is facing to the rear of the vehicle and the operator is facing forwardly while viewing the picture in the monitor, the operator will not see left and right in reverse compared with what he sees in a rear view mirror.

U.S. Pat. No. 3,689,695 discloses a vehicle viewing system in which a television camera is mounted above the top of the operator's truck cab and has a support designed to permit the camera to have vertical, horizontal, rotary, or tilting movement, or lateral movement across the width of the cab.

None of the foregoing prior patents discloses a system whereby the operator can accurately tell how close the backing vehicle is to a loading dock or other parking objective. The preferred embodiment of the present invention meets that long existing need. Another benefit is that the operator of a vehicle having limited rear vision cannot only see rearwardly approaching vehicles, but can judge how far they are behind.

In accordance with an embodiment of the present invention, a closed circuit television system utilizes distance indicating means having a readout at the operator's station. The distance indicating means can take various forms and involves the use of an on-site permanent or portable backing target or distance indicating indicia on the roadway. Various species of backing target and read-out means are used in different embodiments. For example, in one embodiment, a television monitor has a distance scale on its screen which is coordinated with the size of the backing target to indicate the inverse relationship between the distance from the vehicle to the target and the size of the target image appearing on the screen. This and other embodiments are detailed in the following description.

DESCRIPTION OF THE PREFERRED EMBODIMENT

Figure 1:
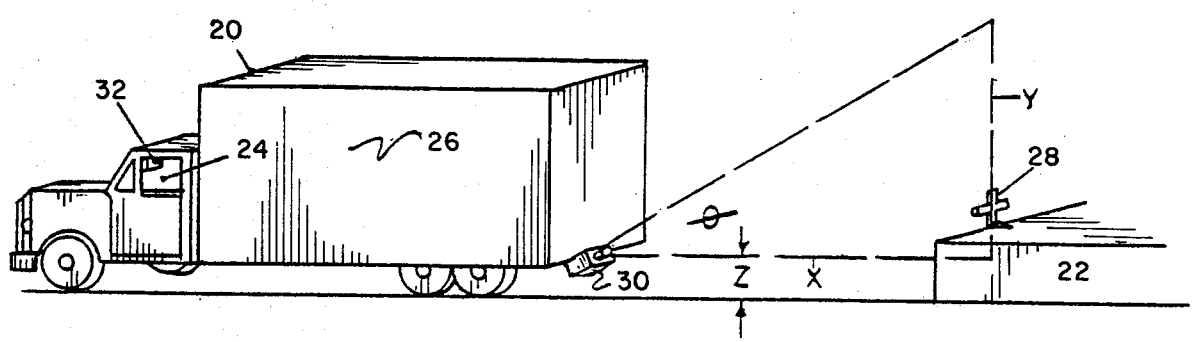
FIG. 1 is a side elevational view of a vehicle which is equipped with the present invention approaching a loading dock.
Figure 2:
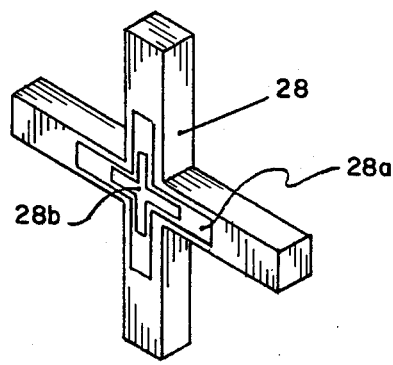
FIG. 2 is a front view of a target for use in a first embodiment.
Figure 3:
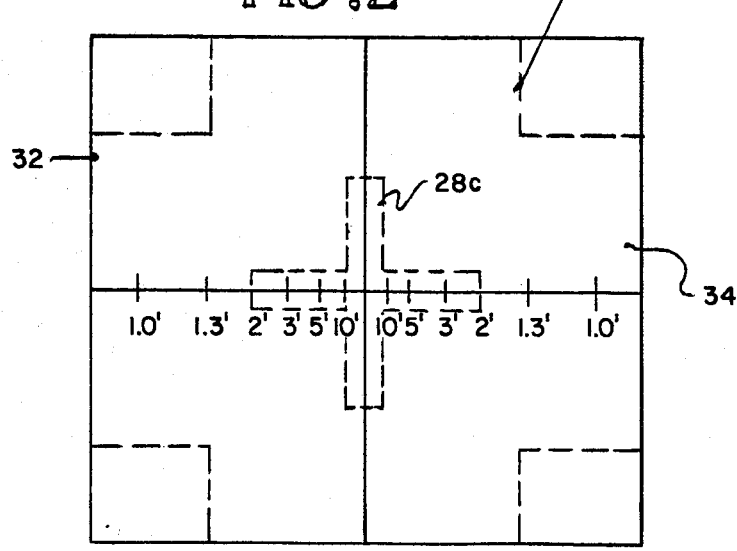
FIG. 3 is a front view of the screen of a television monitor having a scale to be used with the target shown in FIG. 2.

In the first embodiment of the invention, illustrated in FIGS. 1–3, a stadia method is used in conjunction with a closed circuit television system for guidance in backing a transporter such, for example, as a truck 20, into a parking space in front of a loading dock 22. The truck has a forward cab 24 for the operator behind which is a load-carrying compartment 26 blocking the operator's rear vision. A stadia target 28 is mounted at the rear of the parking space, in this instance, on the loading dock 22, and the truck is provided with a television camera 30 located at the rear and bottom of the chassis and a television monitor 32 situated in cab 24 in such a position as to be readily seen by the operator when he is facing forward. Target 28 may be permanently mounted on the loading dock so as to be in view of the camera 30 as the truck approaches while being backed, or can be portable, as on a compact fold-up stand which can be carried aboard the truck for placement by the operator at various loading and unloading sites. Preferably, the camera is laterally centered on the truck in which case the target will normally be placed on the longitudinal center axis of the parking site.

Stadia target 28 comprises multiple images, i.e., target outline 28b is contained within target outline 28c and likewise both target outlines 28a and 28b are much smaller than and are contained within the perimeter of stadia target 28. In this way, the operator may select the particular target image which is appropriate for his present distance from the target. For example, the operator would use target image 28a when between six inches and one foot from the dock, and would use image 28b when he is three inches or less from the dock.

In the preferred embodiment, the image of target 28a would fill the monitor screen when the vehicle was six inches from the dock while 28b would fill the screen at three inches from the dock. Of course, appropriate indicia could be added for each scale on the video monitor, or the markings could be indicated just for the large target 28 for use with the farther distances as shown in FIG. 3.

Figure 4:
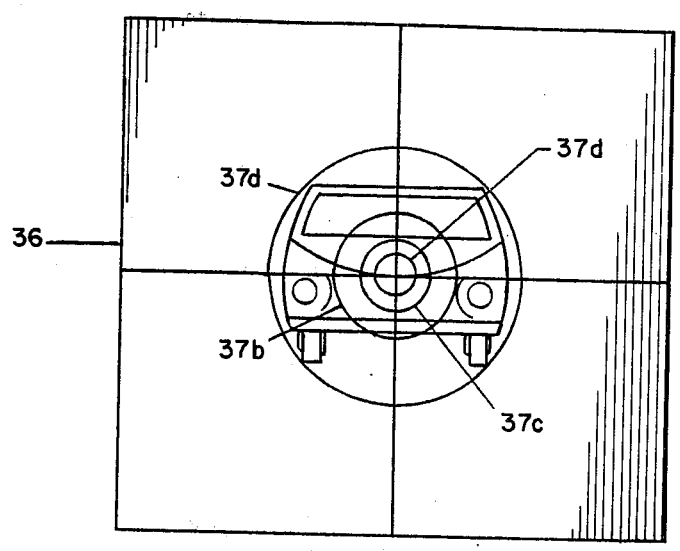
FIG. 4 is a front view of the television monitor screen with a modified scale for use in normal driving.

For parking use, the monitor 32 has a stadia back-up screen 34, as shown in FIG. 3, which may comprise indicia permanently embossed on the viewing screen of the monitor or presented on an auxiliary overlay screen slide-mounted, for example, at the front of the viewing screen. For normal driving use, the monitor has a range screen 36 which may comprise an auxiliary overlay screen to be substituted for the back-up screen 34 or to overlay the stadia back-up indicia, or the range indices and stadia back-up indicia can be on the same screen and preferably be a different color for ease of identification. Note that the images of the stadia target in FIG. 3 and the vehicle in FIG. 4 are added to illustrate the image seen by the operator when the system is in use.

The target 28 may take the form of an equilateral cross as shown, having its vertical and horizontal dimensions each a foot in length, for example. It is preferred to have the back-up screen 34 marked with cross hairs indicating horizontal and vertical axes, and to have these cross hairs subdivided by indicia spaced such that the screen 34 functions as a stadimeter in the horizontal or vertical direction, or in both directions.

The camera 30 preferably has a wide angle lens and is tilted upwardly to give a vertical viewing angle $\phi$ extending upwardly from the horizontal as indicated in FIG. 1. As an example, the camera 30 may have a focal length of 0.5 inches giving a viewing angle $\phi$ of 53.13°. In this case, the horizontal axes of the back-up screen can be marked, for example, as illustrated in FIG. 3, with the numerals indicating the distance in feet from the rear of the truck 20 to the target 28. When the cross target 28 is seen as shown in phantom in FIG. 3, the horizontal arms of the target extend between the right and left two-foot indicia thereby indicating that the rear of the truck is spaced two feet from the target and that the truck is laterally centered relative to the target. If desired, the vertical axis on the screen can also be marked with the target distances. In the illustrated example, when the target horizontally fills the screen, the vehicle will only be twelve inches from the target. Hence, the operator of the truck, by steering while backing such that the target is horizontally centered on the vertical axis of the back-up screen, and watching the target gradually fill the screen, can readily manipulate the truck perfectly up to the loading dock.

The average automobile width is about six feet. Referring to FIG. 4, the indicia rings on the illustrated range screen 36 are spaced so that when the image of a trailing automobile is seen to fill a ring, the trailing automobile is spaced to the rear of the truck approximately the distance indicated on the ring. For example, when the trailing automobile image is approximately the same size as target ring 37a, as indicated in FIG. 4, the truck operator would know that it was about 25 feet behind his truck. Rings 37b, 37c and 37d would indicate a distance of 50 feet, 100 feet and 200 feet, respectively. A wider trailing vehicle such as another truck, would of course, be further behind than indicated in the range scale. In either case, the truck operator would be able to see the trailing vehicle, even if it were so close as to perhaps not be seen in his side view mirrors, and would have an aid in judging the approach speed and distance of the trailing vehicles.

Figure 5:
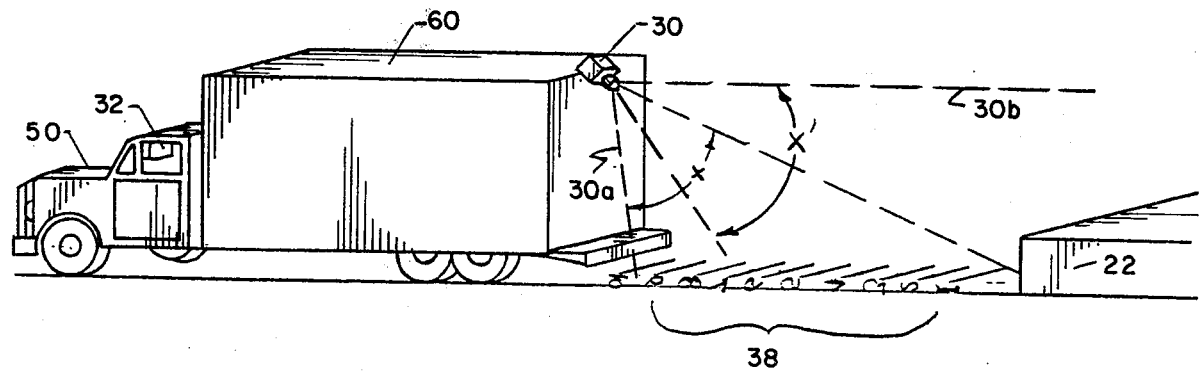
FIG. 5 is a side perspective view of a vehicle as used with a second embodiment.

A second embodiment of the invention is illustrated in FIG. 5, wherein a truck 50 has a television camera 30' mounted near the top of the load compartment 60' at the rear thereof and arranged to be aimed at a downward angle such that the forward extreme 30a of the viewing angle x passes close to the rear bumper. Preferably, the tilt of camera 30' is vertically adjustable by remote control from the operator's compartment between a lowered position aimed downwardly as aforesaid, and a raised position x' for greater range of rear viewing in which the upper extreme 30b of the viewing angle is generally horizontal. The vertical viewing angle adjustment for the camera 30' may be performed by a suitable remote controlled tilting mechanism as, for example, that disclosed in U.S. Pat. No. 3,689,695.

The lowered position x of the camera 30' is used during backing of the truck into a parking site, as, for example, in front of a loading dock 22'. As part of this second embodiment of the invention, the road surface in front of the loading dock 22' is marked with distance measurements from the loading dock as, for example, in feet from the dock, and these distance indicia are made as the mirror images 38 of the respective numerals as shown in FIG. 5. These mirror-like image distance markings 38 can be permanently painted on the road surface or placed on a roll or suitable fabric to be carried on the truck and stretched out by the operator over the road surface before beginning a parking operation.

When viewed by the operator at his television monitor in the driving compartment, the mirror-image numerals 38 will appear in normal numeral form for reading. Hence, the operator can directly read the distance from the rear of the truck to the loading dock on his monitor as he backs the truck toward the dock with the camera 30' tilted downwardly to viewing angle x.

Figure 6:
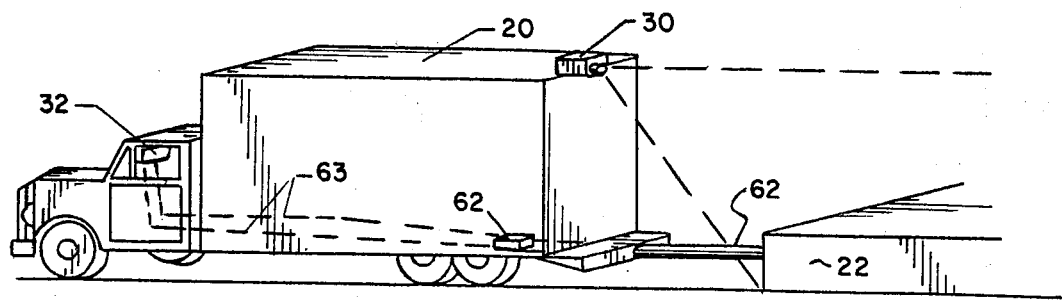
FIG. 6 illustrates an alternate embodiment for determining the distance from the vehicle by using a telescoping rod utilizing a transducer or variable resistor.
Figure 7:
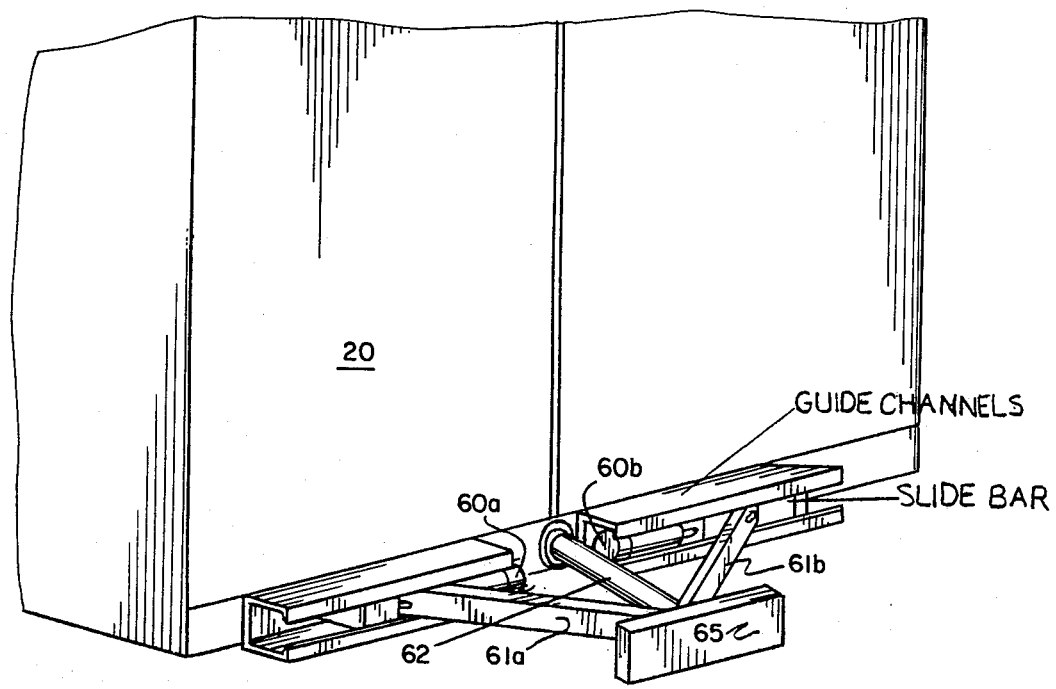
FIG. 7 shows the touch-foot apparatus of the preferred embodiment.

When the camera 30' is tilted to its upward position x', the operator has a long range view to the rear for aid in rear vision while highway driving, or during backing while still relatively far from a desired parking site. The monitor coupled to camera 30' is preferably provided with a range screen 36 for use as previously described. As an alternative to providing the distance measurements on the road surfaces, they can be read from a telescopic rod 62, starting from the tip end, which is arranged to project rearwardly from the vehicle when extended as indicated in FIGS. 6 and 7. The rod 62 can be manually extended by the operator before backing or can be hydraulically or pneumatically extended by internal pressurizing as is well known in the telescopic cylinder art. When the tip of the rod touches an obstruction, the rod will retract responsive to further backing movement of the vehicle. Or, rather than being telescopic, the rod 62 can be slidably mounted for its entire length in the vehicle.

Figure 8:
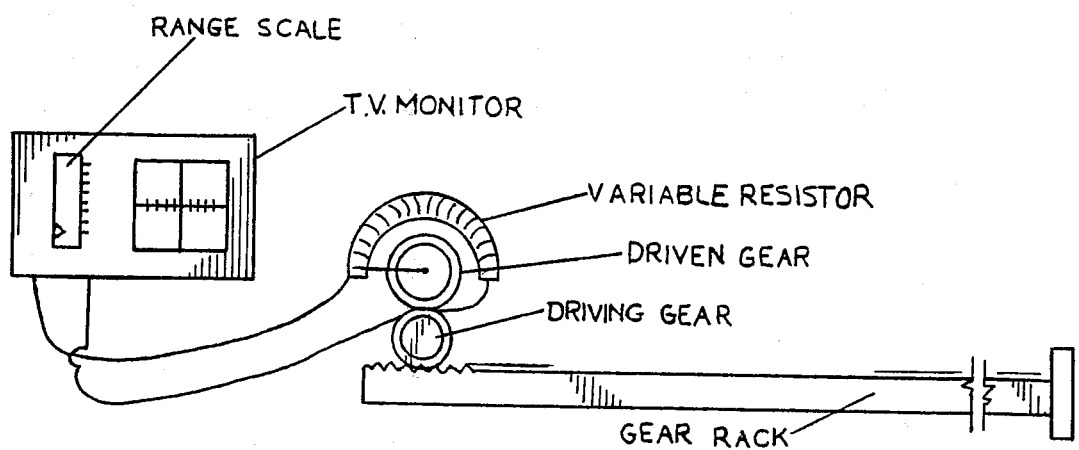
FIG. 8 illustrates the touch-foot embodiment which employs a potentiometer coupled to a meter readout.

Actuator arms 61a and 61b are driven by actuation cylinders 60a and 60b to cause tube 62 to extend and place touch foot 65 at its farthest position from the vehicle 20. As the vehicle reaches a predetermined distance, several feet or several inches, from the dock, the touch foot 65 will engage the side of the dock. Thereafter, as the vehicle 20 is backed toward the dock, telescoping tube 62 will be compressed, driving a potentiometer coupled to a meter which is calibrated in feet or inches, as shown in FIG. 8. The operator can see how close he is to the dock via camera 30 by reading the meter adjacent to his TV monitor.

Figure 9:
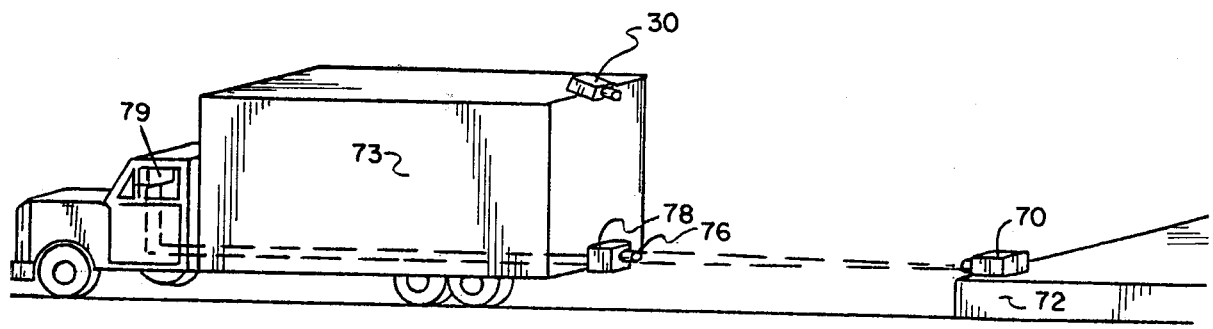
FIG. 9 illustrates an embodiment which utilizes a light intensity measurement which could incorporate a laser diode source whose intensity would be calibrated to feet and inches, read at the operator's station.

Referring now to FIG. 9, there is shown an alternate embodiment which uses an infrared laser emitter 70 which is positioned upon dock 72. Infrared light is used since it is not affected by reflected sunlight. In this embodiment, the closed circuit video system is for viewing purposes, but the distance is indicated by the indications of a meter 79.

A sensor unit 76 is mounted in the rear of vehicle 73. The sensor comprises a receiver 78 sensitive to infrared light and a meter 79 which indicates the intensity of the infrared light received. In the preferred embodiment, a photo-conductive cell is used for receiver 78 and an ohmmeter is used for meter 79. The resistance measured by meter 79 has a preselected relationship to the intensity of the infrared light received by receiver 78 and hence, appropriate scale markings can be added to the face of meter 79 to indicate the distance of the vehicle from light source 70 and dock 72.

Figure 10:
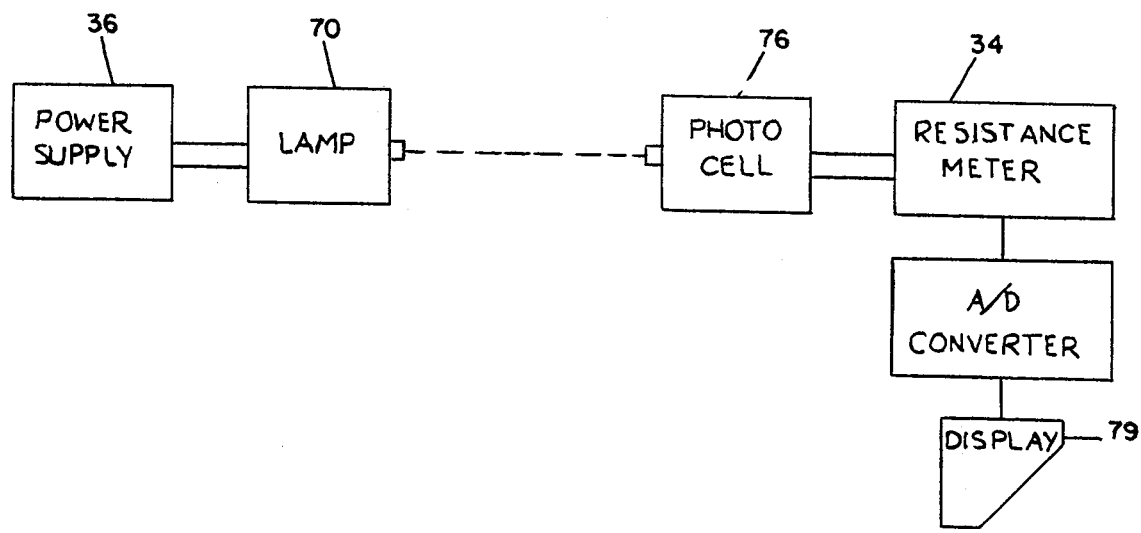
FIG. 10 is a schematic of the FIG. 9 embodiment.

As indicated in FIG. 10, the emitter 70 can comprise an infrared lamp and the range finder 76 can comprise a photoelectric cell connected to a resistance meter whose output is fed to an A/D converter. The output of the latter feeds the display. In the alternative, the emitter can be a distinctive sound source and the display unit can include a suitable microphone sensitive to the frequency of the emitter in place of the photoelectric cell.

I claim:

1. A system for assisting an operator while backing into a given parking site a self-propelled transporter having a forwardly facing operator's station from which the operator's vision directly to the rear of the transporter is blocked by part of the transporter;

a closed circuit video system including rearwardly directed camera means at the rear of the transporter for viewing the zone immediately to the rear of the transporter otherwise blocked from the operator's vision, and a viewing montior at the operator's station operatively connected to the camera means;

distance indicating means for visually indicating at the operator's station, as the transporter is being backed into a parking site, the decreasing distance from the transporter to the rear end of the parking site;

a backing target having a preselected dimensional parameter for placing at the parking site to be viewed by the camera as the transporter is backed toward the parking site; and legend means coupled to said viewing monitor in said video system for providing an indication at said monitor, as the transporter approaches said target while being backed, of the decreasing distance from the transporter to the backing target by utilizing the correspondingly increasing size of the preselected dimensional parameter of the backing target image appearing at the monitor.

2. A system according to claim 1 in which said legend means comprises a distance scale appearing at said monitor which is coordinated with the size of said backing target to indicate the inverse relationship between the distance from the transporter to the target and the size of the target image appearing at the monitor.

3. A system for assisting an operator while backing into a given parking site a self-propelled transporter having a forwardly facing operator's station from which the operator's vision directly to the rear of the transporter is blocked by part of the transporter;

a closed circuit video system including rearwardly directed camera means at the rear of the transporter for viewing the zone immediately to the rear of the transporter otherwise blocked from the operator's vision, and a viewing monitor at the operator's station operatively connected to the camera means; and distance indicating means for visually indicating at the operator's station, as the transporter is being backed into a parking site, the decreasing distance from the transporter to the rear end of the parking site, said distance indicating means comprising the mirror image of a plurality of distance indicating indicia located on the ground surface of the parking site to show the respective distance from each of the indicia to the rear end of the parking site, said camera means being arranged and adapted to view the rear extremity of the transporter as the latter backs over said indicia.

4. A system according to claim 3 in which said camera means is elevated well above the bottom of the transporter and has a wide angle lens set to view below the rearmost extremity of the transporter and rearwardly therebeyond.

5. A system for assisting an operator while backing into a given parking site a self-propelled transporter having a forwardly facing operator's station from which the operator's vision directly to the rear of the transporter is blocked by part of the transporter;

a closed circuit video system including rearwardly directed camera means at the rear of the transporter for viewing the zone immediately to the rear of the transporter otherwise blocked from the operator's vision, and a viewing monitor at the operator's station operatively connected to the camera means; and distance indicating means for visually indicating at the operator's station, as the transporter is being backed into a parking site, the decreasing distance from the transporter to the rear end of the parking site, said distance indicating means comprising a portable strip with distance indicating indicia thereon for manual placement longitudinally of a selected parking site.

6. A system according to claim 5 in which said indicia comprise the mirror image of numerals.

7. A system for assisting an operator while backing into a given parking site a self-propelled transporter having a forwardly facing operator's station from which the operator's vision directly to the rear of the transporter is blocked by part of the transporter;

a closed circuit video system including rearwardly directed camera means at the rear of the transporter for viewing the zone immediately to the rear of the transporter otherwise blocked from the operator's vision, and a viewing monitor at the operator's station operatively connected to the camera means; and distance indicating means for visually indicating at the operator's station, as the transporter is being backed into a parking site, the decreasing distance from the transporter to the rear end of the parking site, said distance indicating means comprises a target means at the parking site for emitting some preselected form of detectable emanations and range finder means on the transporter adapted to provide a readout at the operator's station indicating the distance from the transporter to the target in response to said detectable emanations.

8. A system according to claim 7 in which said target means comprises a light source and said range finder means is adapted to measure the intensity of light emitting from said source and convert such measurement into a distance readout at the operator's station.

9. A system according to claim 8 in which said target means comprises a sound source and said range finder means is adapted to measure the intensity of sound emitting from said source and convert such measurement into a distance readout at the operator's station.

* * * * *